(12) United States Patent
Bian et al.

(10) Patent No.: US 11,068,752 B2
(45) Date of Patent: Jul. 20, 2021

(54) INSPECTION SYSTEMS AND METHODS INCLUDING IMAGE CLASSIFICATION MODULE

(71) Applicant: General Electric Company, Schenectady, NY (US)

(72) Inventors: Xiao Bian, Glenville, NY (US); Colin James Parris, Brookfield, CT (US); Bernard Patrick Bewlay, Niskayuna, NY (US); Masako Yamada, Niskayuna, NY (US); Shaopeng Liu, Clifton Park, NY (US); Peng Chu, Philadelphia, PA (US)

(73) Assignee: General Electric Company, Schenectady, NY (US)

( * ) Notice: Subject to any disclaimer, the term of this patent is extended or adjusted under 35 U.S.C. 154(b) by 144 days.

(21) Appl. No.: 16/670,053

(22) Filed: Oct. 31, 2019

(65) Prior Publication Data

US 2021/0133511 A1    May 6, 2021

(51) Int. Cl.
*G06K 9/62* (2006.01)
*G06F 16/51* (2019.01)
*G06F 16/55* (2019.01)

(52) U.S. Cl.
CPC ........... *G06K 9/6267* (2013.01); *G06F 16/51* (2019.01); *G06F 16/55* (2019.01); *G06K 9/6217* (2013.01)

(58) Field of Classification Search
None
See application file for complete search history.

(56) References Cited

U.S. PATENT DOCUMENTS 10,347,010 B2   7/2019   Risman et al.
10,402,688 B2   9/2019   Brauer et al.
(Continued)

FOREIGN PATENT DOCUMENTS

CN     108229523 A    6/2018
WO    2019125439 A1   6/2019

OTHER PUBLICATIONS

Sun et al., "Surface Defects Detection Based on Adaptive Multiscale Image Collection and Convolutional Neural Networks", IEEE Transactions on Instrumentation and Measurement, pp. 1-11, Mar. 6, 2019.

(Continued)

*Primary Examiner* — Edward Park
(74) *Attorney, Agent, or Firm* — Armstrong Teasdale LLP

(57) ABSTRACT

A method of inspecting a component using an image inspection controller that includes a processor communicatively coupled to a memory includes classifying each sample image in a first database as a first sample or a second sample using a classification module, extracting at least one class generic feature from each first sample to generate a plurality of class generic features, and extracting at least one class specific feature from each second sample to generate a plurality of class specific features. The method further includes combining the class generic features and the class specific features to generate a plurality of supplemental images. The method further includes storing the sample images and the supplemental images in a second database, classifying each sample image and each supplemental image, capturing at least one image of the component using a camera, and identifying at least one feature of the component in the at least one image of the component using the classification module.

20 Claims, 3 Drawing Sheets

(56) References Cited

U.S. PATENT DOCUMENTS

2016/0299899 A1* 10/2016 Logachev .............. G06N 20/00
2018/0039861 A1    2/2018 Saito
2018/0101752 A1*  4/2018 Chen .................. G06K 9/00201
2019/0197358 A1    6/2019 Madani et al.
2020/0364856 A1* 11/2020 Nicolaes .............. G06K 9/6277

OTHER PUBLICATIONS

Arikan et al., "Surface Defect Classification in Real-Time Using Convolutional Neural Networks", Electrical Engineering and Systems Science, Image and Video Processing, arXiv.org>eess>arXiv:1904.04671, pp. 1-16, Apr. 7, 2019.

Konrad et al., "Surface Defect Detection for Automated Inspection Systems using Convolutional Neural Networks", 27th Mediterranean Conference on Control and Automation (MED), Akko, Israel, pp. 75-80, Jul. 1-4, 2019.

Staar et al., "Anomaly Detection with Convolutional Neural Networks for Industrial Surface Inspection", 12th CIRP Conference on Intelligent Computation in Manufacturing Engineering, Procedia CIRP, vol. 79, pp. 484-489, 2019.

\* cited by examiner

INSPECTION SYSTEMS AND METHODS INCLUDING IMAGE CLASSIFICATION MODULE

BACKGROUND

The field of the disclosure relates generally to systems and methods of inspecting a component, and more particularly, to systems and methods of inspecting a component using an image classification module.

At least some known inspection systems utilize software that analyzes images of a component to identify features or anomalies such as defects, material wear, and damage. However, the inspection systems must be trained to recognize the features in the images. In some scenarios, the inspection systems are trained by having the inspection systems analyze and sort sample images according to features identified in the sample images. In at least some inspection systems, the sample images are sorted into classes based on identified features. As the inspection systems analyze the sample images, the inspection systems may be programmed to "learn" to recognize common features in the sample images. However, sufficient sample images may not be available for all classes and the inspection systems may not learn to properly recognize the features of sample images in tail-classes, i.e., classes that include less than a threshold number of sample images. As a result, at least some known inspection systems are not able to accurately identify at least some features of components.

Accordingly, there is a need for inspection systems that can be trained using data sets including tail-classes and that have an improved accuracy in identifying features and classifying images in comparison to at least some known inspection systems.

BRIEF DESCRIPTION

In one aspect, a method of inspecting a component using an image inspection controller that includes a processor communicatively coupled to a memory is provided. The method includes classifying, using the processor, each sample image of a plurality of sample images in a first database as a first sample or a second sample using a classification module. The first database is stored in the memory of the image inspection controller. The method also includes extracting, using the processor, at least one class generic feature from each first sample to generate a plurality of class generic features and extracting, using the processor, at least one class specific feature from each second sample to generate a plurality of class specific features. The method further includes combining, using the processor, the plurality of class generic features and the plurality of class specific features to generate a plurality of supplemental images. The method also includes storing, using the processor, a second database including the plurality of sample images and the plurality of supplemental images in a second database. The second database is stored in the memory of the image inspection controller. The method further includes classifying, using the processor, each sample image of the plurality of sample images and each supplemental image of the plurality of supplemental images of the second database using the classification module. The method also includes capturing at least one image of the component using a camera coupled to the image inspection controller, and identifying, using the processor, at least one feature of the component in the at least one image of the component using the classification module. The classification module is configured to learn from the classification of the plurality of sample images and the plurality of supplemental images to increase the accuracy of the classification module in identifying the at least one feature of the component.

In another aspect, a system for inspecting a component is provided. The system includes a camera configured to capture at least one image of the component and an image inspection controller communicatively coupled to the camera. The system is configured to identify at least one feature of the component in the at least one image. The image inspection controller includes at least one memory including a first database including a plurality of sample images. The controller also includes at least one processor configured to access the at least one memory and operate in accordance with a classification module. The at least one processor is programmed to classify each sample image of the plurality of sample images in the first database as a first sample or a second sample. The at least one processor is also programmed to extract at least one class generic feature from each first sample to generate a plurality of class generic features, and extract at least one class specific feature from each second sample to generate a plurality of class specific features. The at least one processor is further configured to combine the plurality of class generic features and the plurality of class specific features to generate a plurality of supplemental images. The at least one processor is also configured to store the plurality of sample images and the plurality of supplemental images in a second database. The second database is stored on the memory. The at least one processor is further configured to classify each sample image of the plurality of sample images and each supplemental image of the plurality of supplemental images in the second database. The at least one processor is also configured to identify at least one feature of the component in the at least one image of the component using a classification module. The classification module is configured to learn from the classification of the plurality of sample images and the plurality of supplemental images to increase the accuracy of the classification module in identifying the at least one feature of the component.

In yet another aspect, a classification module for identifying at least one feature in at least one image of a component is provided. The classification module is configured to cause a processor to classify each sample image of a plurality of sample images in a first database as a first sample or a second sample. The classification module also causes the processor to extract at least one class generic feature from each first sample to generate a plurality of class generic features, and extract at least one class specific feature from each second sample to generate a plurality of class specific features. The classification module further causes the processor to analyze the classification of the plurality of sample images, identify a first subset of the plurality of first samples that have been incorrectly classified, identify a second subset of the plurality of second samples that have been incorrectly classified, and combine the plurality of class generic features extracted from the first subset of the plurality of first samples and the plurality of class specific features extracted from the second subset of the plurality of second samples to generate a plurality of supplemental images. The classification module also causes the processor to store the plurality of sample images and the plurality of supplemental images in a second database. The classification module further causes the processor to classify each sample image of the plurality of sample images and each supplemental image of the plurality of supplemental images in the second database. The classification module also causes the processor to identify the at least one feature in the at least one image of the component. The classification module is configured to learn from the classification of the plurality of sample images and the plurality of supplemental images to increase the accuracy of the classification module in identifying the at least one feature of the component.

DRAWINGS

These and other features, aspects, and advantages of the present disclosure will become better understood when the following detailed description is read with reference to the accompanying drawings in which like characters represent like parts throughout the drawings, wherein.

Figure 1:
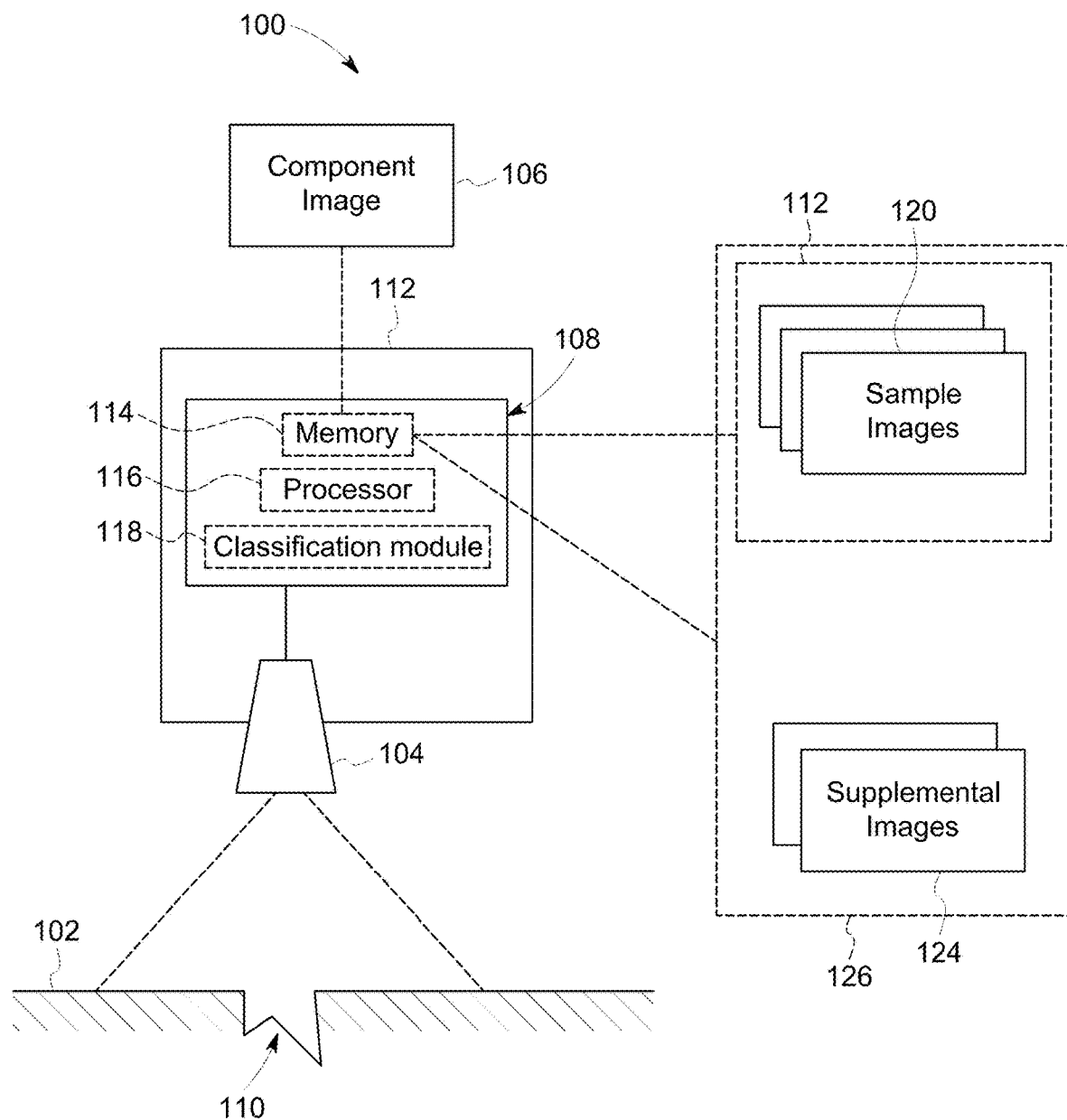
FIG. 1 is a schematic diagram of a system for inspecting a component.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, an analog computer, a programmable logic controller (PLC), and application specific integrated circuit (ASIC), and other programmable circuits, and these terms are used interchangeably herein. In the embodiments described herein, "memory" may include, but is not limited to, a computer-readable medium, such as a random access memory (RAM), a computer-readable non-volatile medium, such as a flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, and a keyboard. Alternatively, other computer peripherals may also be used that may include, for example, but not be limited to, a scanner. Furthermore, in the exemplary embodiment, additional output channels may include, but not be limited to, an operator interface monitor or heads-up display. Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an ASIC, a PLC, a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

As used herein, the terms "anomaly" and "anomalies" refer to areas of variation within a component. Areas of variation include, for example and without limitation, defects, dislocations, cracks, wear, voids, deformations, stress concentrations, disruptions, fissures, inclusion of foreign particles, and corrosion.

The disclosure includes systems and methods for identifying at least one feature of a component. The systems and methods described herein include a camera configured to capture images of the component, and a classification module configured to analyze the images to identify features of the component. The classification module utilizes self-learning and image augmentation to increase the accuracy of feature identification and to broaden the range of component features that are accurately identified. For example, the classification module analyzes and classifies a plurality of sample images using a multi-class system. A class is considered a "head class" if the class has a number of samples that is greater than or equal to a threshold. A class is considered a "tail class" if the class has a number of samples that is less than the threshold. The classification module generates second, supplemental images to include in each tail class such that each class has a sufficient number of samples to be considered a head class. As a result, the classification module is able to classify a greater number of images for classes that were originally considered tail classes and, thereby, the classification module is able to learn to more accurately identify features and classify the images in the original tail classes.

The systems and methods described herein include an image generation phase that enables a classification module to analyze a greater number of unique images than systems that rely solely on provided samples. For example, the classification module extracts class generic and class specific features from images and randomly combines the extracted features to generate supplemental images. In some embodiments, the class generic features are extracted from first samples of a head class and the class specific features are extracted from second samples of a tail class. As a result, the classification module is able to analyze a greater number of unique images which represent a broader range of feature combinations than the original dataset. Moreover, the supplemental images are closer to actual images than some computer-generated samples because the supplemental images are generated from features extracted from the original dataset.

FIG. 1 is a schematic diagram of a system 100 for inspecting a component 102. System 100 includes a camera 104 configured to capture at least one image 106 of component 102, and a controller 108 communicatively coupled to camera 104. Controller 108 is configured to receive images 106 from camera 104 and identify at least one feature 110 of component 102 based on images 106. In some embodiments, system 100 includes a repair tool (not shown) configured to perform a maintenance operation for component 102.

In some embodiments, system 100 includes a positioning apparatus 112 configured to position camera 104 relative to component 102 and enable camera 104 to capture images of areas of component 102. For example, in some embodiments, positioning apparatus 112 includes a motorized apparatus configured to travel around component 102 and position camera 104 relative to component 102. In further embodiments, positioning apparatus 112 includes an actuator assembly such as an articulated arm assembly that is configured to position camera 104 relative to component 102. In alternative embodiments, system 100 includes any positioning apparatus 112 that enables system 100 to operate as described herein.

In some embodiments, controller 108 is configured to control one or more components of system 100 such as positioning apparatus 112 and/or camera 104. Also, in the exemplary embodiment, controller 108 includes at least one memory 114 configured to store images 106 captured by camera 104, and at least one processor 116 configured to access memory 114. In the exemplary embodiment, processor 116 may be programmed by encoding an operation using one or more executable instructions and providing the executable instructions in memory 114. In the exemplary embodiment, processor 116 is programmed to access images 106 in memory 114 and operate according to a classification module 118 to classify images 106. In particular, controller 108 is configured to operate in accordance with classification module 118 to identify features such as anomalies of component 102 based on at least one image 106 captured by camera 104. For example, classification module 118 utilizes a multi-class recognition and classification process and identifies features based on the classification process refined during one or more training phases. Classification module 118 may be included in software or programming stored on memory 114, incorporated into processor 116, and/or stored at least partially on an external computing device. In alternative embodiments, system 100 includes any controller 108 that enables system 100 to operate as described herein. For example, in some embodiments, at least a portion of controller 108 is located remote from other components of system 100 and is configured to communicate with components of system 100 via a wired and/or unwired link.

Memory 114 may comprise any appropriate information storage device, including combinations of magnetic storage devices (e.g., a hard disk drive), optical storage devices, mobile telephones, and/or semiconductor memory devices. In the exemplary embodiment, memory 114 includes one or more devices that enable information, such as executable instructions and/or other data, to be stored and retrieved. Moreover, memory 114 includes one or more computer readable media, such as, without limitation, dynamic random access memory (DRAM), static random access memory (SRAM), a solid state disk, and/or a hard disk. In the exemplary embodiment, memory 114 stores, without limitation, application source code, application object code, configuration data, additional input events, application states, assertion statements, validation results, and/or any other type of data.

In the exemplary embodiment, classification module 118 utilizes a training process involving self-learning and image augmentation to increase the accuracy of a classification process for images 106. During the training process, controller 108 is provided with a plurality of sample images 120. Sample images 120 may be stored in a first database 122 on memory 114. Controller 108 classifies each sample image 120 in first database 122 as, for example, a first sample or a second sample. As controller 108 classifies sample images 120, controller 108 learns from the classification process using a deep convolutional neural network (CNN). Accordingly, the accuracy by which controller 108 classifies images 106 is increased as controller 108 classifies more sample images 120. For example, in some embodiments, incorrectly classified sample images 120 are identified and reclassified by classification module 118. Accordingly, classification module 118 can correct any issues causing the initial, incorrect classification of sample images 120 and learn how to correctly identify sample images 120 and images 106 in the future.

In some embodiments, classification module 118 uses a threshold of sample images 120 in each class to determine if classification module 118 has classified enough sample images 120 to be considered accurate for identifying features and classifying images 106 that correspond to the respective class. For example, in some embodiments, the threshold of sample images 120 in a class may be approximately five percent of the total number of sample images 120. If a class has a number of sample images 120 that is greater than or equal to the threshold, then the class is considered a "head class" and classification module 118 recognizes that the class has an adequate number of sample images 120 for classification module 118 to have learned to accurately classify images 106 that correspond to the class. If a class has a number of samples that is less than the threshold, then the class is considered a "tail class" and classification module 118 recognizes that additional sample images 120 are required for classification module 118 to learn to accurately classify images 106 that correspond to the class.

Also, in the exemplary embodiment, classification module 118 increases the number of sample images 120 available for the tail classes by generating supplemental images 124 that correspond to tail classes. For example, classification module 118 combines class generic features from sample images 120 in a head class and class specific features from sample images 120 in a tail class to generate supplemental images 124 that classification module 118 has not previously classified and that are properly classified in the tail classes. In the exemplary embodiment, classification module 118 generates a number of supplemental images 124 that is sufficient to raise the number of sample images 120 and supplemental images 124 in the tail classes above the threshold.

Supplemental images 124 may be stored in a second database 126 on memory 114. Second database 126 may include at least some sample images 120. Accordingly, second database 126 provides sample images 120 and supplemental images 124 for classification module 118 to classify and, thereby, increases the accuracy of classification module 118 because second database 126 includes greater variation in image features than first database 122.

Figure 2:
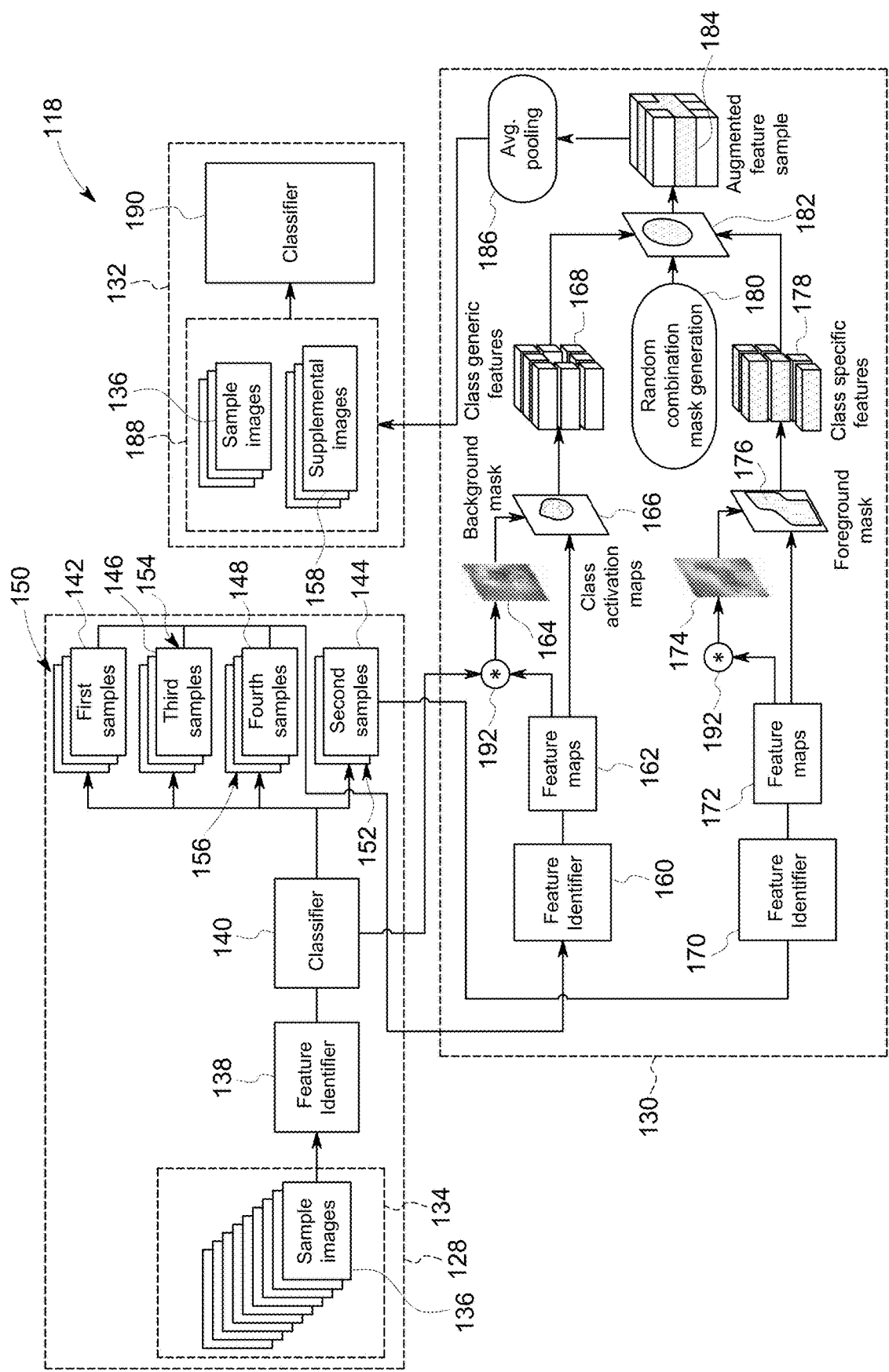
FIG. 2 is a schematic diagram of a classification module of the system shown in FIG. 1.

FIG. 2 is a schematic diagram of a classification module 118 of system 100. In the exemplary embodiment, classification module 118 includes a training phase 128, an image generation phase 130, and an augmented training phase 132. Phases 128, 130, and 132 may be performed sequentially in any order and/or performed at least partially simultaneously. In alternative embodiments, classification module 118 includes any phase that enables classification module 118 to operate as described herein.

In the exemplary embodiment, training phase 128 includes accessing a first database 134 including a plurality of sample images 136 and analyzing sample images 136. For example, in some embodiments, first database 134 is stored in memory 114 (shown in FIG. 1). In alternative embodiments, classification module 118 is configured to receive and analyze any images that enable classification module 118 to operate as described herein.

Also, in the exemplary embodiment, training phase 128 includes identifying features of sample images 136 using a feature identifier 138, and classifying sample images 136 using a classifier 140 based on the identified features. Classification module 118 utilizes multi-class recognition and/or any other suitable classification method to classify sample images 136. Each sample image 136 is classified as a first sample 142, a second sample 144, a third sample 146, or a fourth sample 148. First samples 142 define a first class 150, second samples 144 define a second class 152, third samples 146 define a third class 154, and fourth samples 148 define a fourth class 156. First class 150, third class 154, and fourth class 156 each include more samples that a threshold value and are considered "head classes". In this example, second class 152 includes less samples than the threshold and is considered a "tail class". In alternative embodiments, classification module 118 classifies sample images 136 in any manner that enables classification module 118 to operate as described herein.

In addition, in the exemplary embodiment, image generation phase 130 generates supplemental images 158 to supplement sample images 136 in any of classes 150, 152, 154, 156. In the exemplary embodiment, image generation phase 130 is configured to generate supplemental images 158 for second class 152. Moreover, image generation phase 130 is configured to provide an amount of supplemental images 158 that is sufficient for the number of second samples 144 and supplemental images 158 in second class 152 to be greater than the threshold. In alternative embodiments, image generation phase 130 provides any supplemental images 158 that enable classification module 118 to operate as described herein.

Image generation phase 130 includes receiving at least one sample (e.g., samples 142, 146, 148) of at least one head class (e.g., first class 150, third class 154, and fourth class 156) from training phase 128 and identifying features of samples 142, 146, 148 using a feature identifier 160. The identified features of each sample 142, 146, 148 are used to generate feature maps 162 for samples 142, 146, 148. For example, classification module 118 utilizes focal recognition to identify the focus of an image and, thereby, recognize background areas and foreground areas in the image. For each class, background areas may include class generic features and foreground areas may include class specific features. In addition, classification module 118 compares feature maps 162 and class activation maps 164. Class activation maps 164 indicate activation hot points where the focus of several images in the respective class are located at a similar area. Class activation maps 164 may be provided from training phase 128. Based on the comparison of feature maps 162 and class activation maps 164, classification module 118 generates a background mask 166 and extracts class generic features 168 from each sample 142, 146, 148 using background mask 166.

Also, in the exemplary embodiment, image generation phase 130 includes receiving at least one sample (e.g., second sample 144) of a tail class (e.g., second class 152) from training phase 128 and identifying features of second sample 144 using a feature identifier 170. The identified features of second sample 144 are used to generate a feature map 172 for second sample 144. In addition, classification module 118 compares feature maps 172 and a class activation map 174. Based on the comparison of feature maps 172 and class activation maps 174, classification module 118 generates a foreground mask 176 and extracts class specific features 178 from sample 144 using foreground mask 176.

The extracted class generic features 168 from samples 142, 146, 148 and the extracted class specific features 178 from sample 144 are randomized and combined using a randomizer 180 to generate at least randomized feature combination 182. For example, at least one class specific feature 178 from sample 144 is combined with at least one class generic feature 168 from samples 142, 146, 148 to generate at least one randomized feature combination 182. In some embodiments, the classifications of the plurality of sample images 136 are compared to external classification data to identify any samples 142, 144, 146, 148 that were incorrectly classified. For example, a first subset of samples 142, 146, 148 includes samples 142, 146, 148 that have been incorrectly classified by classifier 140 of training phase 128. Also, a second subset of second samples 144 includes second samples 144 that have been incorrectly classified by classifier 140 of training phase 128. In some embodiments, class generic features 168 extracted from the first subset of samples 142, 146, 148 are combined with class specific features 178 extracted from the second subset of second samples 144 to generate supplemental images 158. As a result, image generation phase 130 is able to generate a unique set of randomized feature combinations 182 including features which were difficult for classification module 118 to classify during training phase 128. The randomized feature combinations 182 are processed to provide augmented feature samples 184 which contain one or more feature combinations arranged to simulate an image 106 (shown in FIG. 1).

After an average pooling 186, augmented feature samples 184 are provided as supplemental images 158 and are included in a second database 188 for classification by classification module 118. In some embodiments, second database 188 is stored on memory 114 (shown in FIG. 1). In the exemplary embodiment, second database 188 includes sample images 136 and supplemental images 158. Classification module 118 classifies sample images 136 and supplemental images 158 into classes (e.g., first class 150, second class 152, third class 154, and fourth class 156) using classifier 190 in augmented training phase 132. Classification module 118 is configured to learn from the classification of sample images 136 and supplemental images 158 to increase the accuracy of classification module 118 in identifying at least one feature of a component. In the exemplary embodiment, second database 188 includes more of each of sample images 136 and supplemental images 158 than the threshold.

In addition, in some embodiments, classification module 118 includes CNN operations 192 that process information and "learn" during training phase 128, image generation phase 130, and/or augmented training phase 132. In the exemplary embodiment, classification module 118 includes CNN operations 192 that utilize information from feature maps 162, 172 and information from classifier 140 of training phase 128 to provide class activation maps 164, 174 for image generation phase 130.

Figure 3:
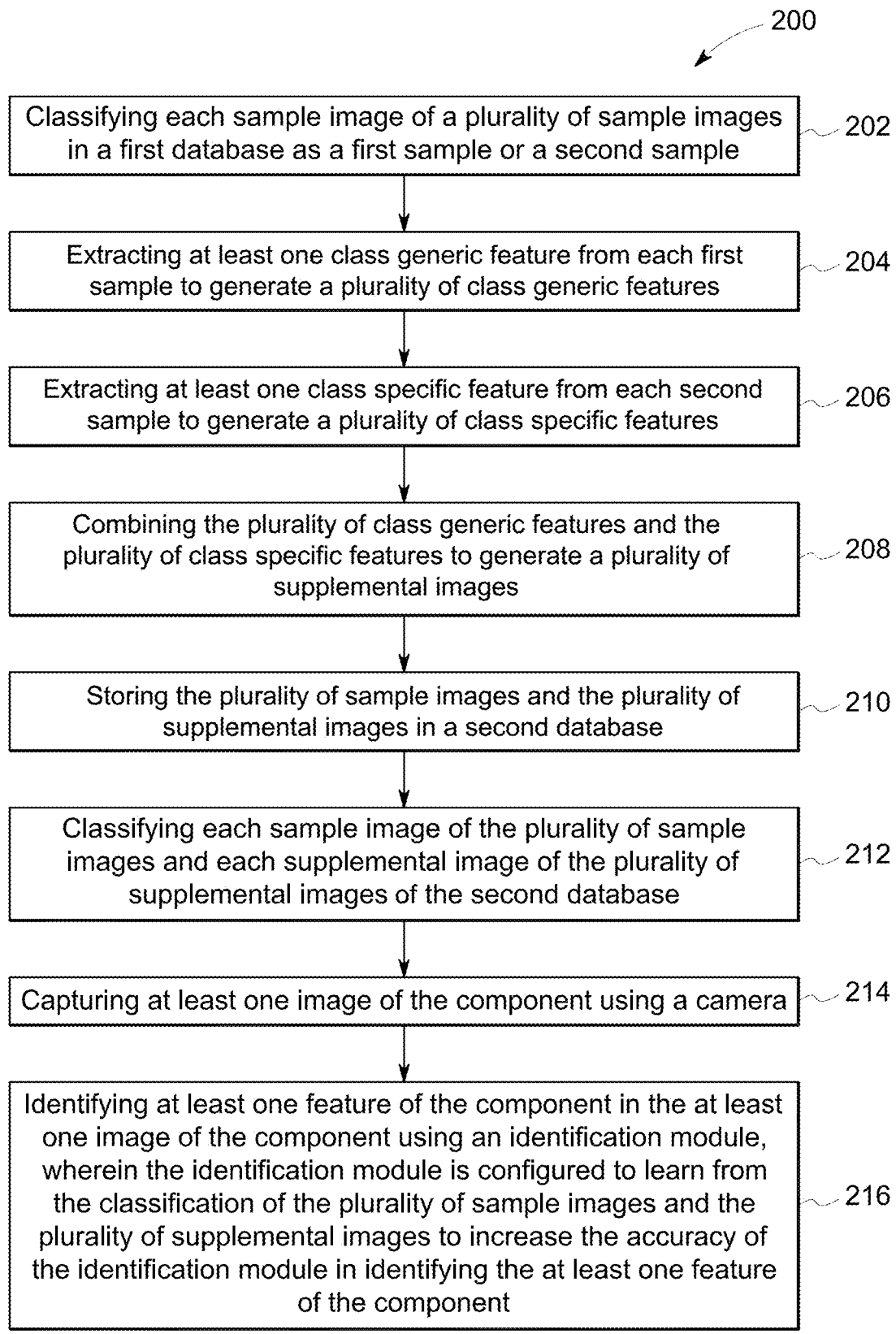
FIG. 3 is a flow diagram of an exemplary method for inspecting a component.

FIG. 3 is a flow diagram of an exemplary method 200 for inspecting a component. With reference to FIGS. 1-3, method 200 includes classifying 202 each sample image 136 in first database 122 as first sample 142 or second sample 144. In some embodiments, after classification, first samples 142 and second samples 144 are counted and compared to the total number of sample images 136. Moreover, the ratio of first samples 142 to sample images 136 and the ratio of second samples 144 to sample images 136 are compared to a threshold. A class including a number of samples 142, 144 above or equal to the threshold is a head class. A class including a number of samples 142, 144 below the threshold is a tail class. For example, in some embodiments, the threshold is 1:20 and a ratio of the number of first samples 142 to the number of sample images 136 is greater than or equal to 1:20. In addition, a ratio of the number of second samples 144 to the number of sample images 136 is less than 1:20.

Method 200 includes extracting 204 at least one class generic feature from each first sample 142 to generate a plurality of class generic features 168. For example, in some embodiments, extracting 204 includes identifying at least one feature in each first sample 142, generating feature map 162 for first samples 142, and comparing each first sample 142 to feature map 162 to identify class generic feature 168 of each first sample 142.

Also, in the exemplary embodiment, method 200 includes extracting 206 at least one class specific feature from each second sample 144 to generate a plurality of class specific features. For example, in some embodiments, extracting 206 includes identifying at least one feature in each second sample 144, generating feature map 172 of second samples 144, and comparing each second sample 144 to feature map 172 to identify class specific feature 178 of each second sample 144.

In addition, in the exemplary embodiment, method 200 includes combining 208 the plurality of class generic features 168 and the plurality of class specific features 178 to generate a plurality of supplemental images 158. In some embodiments, method 200 includes randomizing the plurality of class generic features 168 and the plurality of class specific features 178 prior to combining 208 the plurality of class generic features 168 and the plurality of class specific features 178. In further embodiments, a plurality of class generic features 168 extracted from a first subset of first samples 142 that were incorrectly classified by classification module 118 are combined with a plurality of class specific features 178 extracted from a second subset of second samples 144 that were incorrectly classified by classification module 118.

Also, in the exemplary embodiment, method 200 also includes providing 210 second database 188 including sample images 136 and supplemental images 158. Moreover, in the exemplary embodiment, method 200 includes classifying 212 each sample image 136 and each supplemental image 158 in second database 188. Image generation phase 130 increases the number of classified second samples 144 above the threshold. For example, in some embodiments, after image generation phase 130, a ratio of second samples 144 to the number of sample images 136 and supplemental images 158 is greater than or equal to 1:20.

Also, in the exemplary embodiment, method 200 includes capturing 214 at least one image of component 102 using camera 104. Camera 104 may capture images of any portion of component 102. Method 200 further includes identifying 216 at least one feature of component 102 in the at least one image of component 102 using classification module 118. Classification module 118 is configured to learn from the classification of sample images 136 and supplemental images 158 to increase the accuracy of classification module 118 in identifying at least one feature of component 102.

At least one technical effect of the systems and methods described herein includes: (a) increasing training data variation for inspection and classification systems; (b) providing inspection and classification systems that are able to handle long-tail datasets; (c) increasing the recognition accuracy and sensitivity of inspection and classification systems; and (d) providing inspection and classification systems that are able to identify a broader range of features than at least some known systems.

Exemplary embodiments of systems and methods of identifying features of a component are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

A processor or a processing element may employ artificial intelligence and/or be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image data, text data, report data, and/or numerical analysis. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the computer device, the user of the computer device, the computer network hosting the computer device, services executing on the computer device, and/or other data.

Based upon these analyses, the processing element may learn how to identify characteristics and patterns that may then be applied to training models, analyzing sensor data, and detecting abnormalities.

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In some embodiments, the system includes multiple components distributed among a plurality of computer devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment," "exemplary embodiment," or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of inspecting a component using an image inspection controller that includes a processor communicatively coupled to a memory, said method comprising:

classifying, using the processor, each sample image of a plurality of sample images in a first database as a first sample or a second sample using a classification module, wherein the first database is stored in the memory of the image inspection controller;

extracting, using the processor, at least one class generic feature from each first sample to generate a plurality of class generic features;

extracting, using the processor, at least one class specific feature from each second sample to generate a plurality of class specific features;

combining, using the processor, the plurality of class generic features and the plurality of class specific features to generate a plurality of supplemental images;

storing, using the processor, the plurality of sample images and the plurality of supplemental images in a second database, wherein the second database is stored in the memory of the image inspection controller;

classifying, using the processor, each sample image of the plurality of sample images and each supplemental image of the plurality of supplemental images of the second database using the classification module;

capturing at least one image of the component using a camera coupled to the image inspection controller; and identifying, using the processor, at least one feature of the component in the at least one image of the component using the classification module, wherein the classification module is configured to learn from the classification of the plurality of sample images and the plurality of supplemental images to increase the accuracy of the classification module in identifying the at least one feature of the component.

2. A method in accordance with claim 1, wherein extracting the at least one class generic feature from each first sample to generate the plurality of class generic features comprises:
identifying at least one feature in each first sample;
generating a feature map of the first samples; and
comparing each first sample to the feature map to identify the class generic feature of each first sample.

3. A method in accordance with claim 1, wherein extracting the at least one class specific feature from each second sample to generate the plurality of class specific features comprises:
identifying at least one feature in each second sample;
generating a feature map of the second samples; and
comparing each second sample to the feature map to identify the class specific feature of each second sample.

4. A method in accordance with claim 1 further comprising counting the plurality of sample images, and counting the plurality of first samples, wherein the ratio of the number of first samples to the number of sample images is greater than or equal to a predetermined threshold.

5. A method in accordance with claim 4 further comprising counting the plurality of second samples, wherein a ratio of the number of second samples to the number of sample images is less than the predetermined threshold.

6. A method in accordance with claim 5, wherein the plurality of supplemental images are classified as supplemental second samples, wherein a ratio of the sum of the second samples and the supplemental second samples to the number of sample images is greater or equal to the predetermined threshold.

7. A method in accordance with claim 1 further comprising:
analyzing the classification of the plurality of sample images;
identifying a first subset of the plurality of first samples that have been incorrectly classified; and
identifying a second subset of the plurality of second samples that have been incorrectly classified.

8. A method in accordance with claim 7, wherein combining the plurality of class generic features and the plurality of class specific features to generate the plurality of supplemental images comprises combining the plurality of class generic features extracted from the first subset of the plurality of first samples and the plurality of class specific features extracted from the second subset of the plurality of second samples to generate the plurality of supplemental images.

9. A method in accordance with claim 1 further comprising randomizing the plurality of class generic features and the plurality of class specific features prior to combining the plurality of class generic features and the plurality of class specific features.

10. A system for inspecting a component, said system comprising:
a camera configured to capture at least one image of a component;
an image inspection controller communicatively coupled to said camera and configured to identify at least one feature of the component in the at least one image, wherein said image inspection controller comprises:
at least one memory including a first database including a plurality of sample images;
at least one processor configured to access said at least one memory and operate in accordance with a classification module, wherein said at least one processor is programmed to:
classify each sample image of the plurality of sample images in the first database as a first sample or a second sample;
extract at least one class generic feature from each first sample to generate a plurality of class generic features;
extract at least one class specific feature from each second sample to generate a plurality of class specific features;
combine the plurality of class generic features and the plurality of class specific features to generate a plurality of supplemental images;
store the plurality of sample images and the plurality of supplemental images in a second database, wherein the second database is stored on the memory;
classify each sample image of the plurality of sample images and each supplemental image of the plurality of supplemental images in the second database; and
identify at least one feature of the component in the at least one image of the component using a classification module, wherein the classification module is configured to learn from the classification of the plurality of sample images and the plurality of supplemental images to increase the accuracy of the classification module in identifying the at least one feature of the component.

11. A system in accordance with claim 10, wherein said at least one processor is configured to extract the at least one class generic feature from each first sample to generate the plurality of class generic features by:
identifying at least one feature in each first sample;
generating a feature map of the first samples; and
comparing each first sample to the feature map to identify the class generic feature of each first sample.

12. A system in accordance with claim 10, wherein said at least one processor is configured to extract the at least one class specific feature from each second sample to generate the plurality of class specific features by:
identifying at least one feature in each second sample;
generating a feature map of the second samples; and
comparing each second sample to the feature map to identify the class specific feature of each second sample.

13. A system in accordance with claim 10, wherein said at least one processor is further programmed to count the plurality of sample images, and count the plurality of first samples, wherein the ratio of the number of first samples to the number of sample images is greater than or equal to a predetermined threshold.

14. A system in accordance with claim 13, wherein said at least one processor is further programmed to count the plurality of second samples, wherein a ratio of the number of second samples to the number of sample images is less than the predetermined threshold.

15. A system in accordance with claim 14, wherein the plurality of supplemental images are classified as supplemental second samples, wherein a ratio of the sum of the second samples and the supplemental second samples to the number of sample images is greater than or equal to the predetermined threshold.

16. A system in accordance with claim 10, wherein said at least one processor is further programmed to:
analyze the classification of the plurality of sample images;
identify a first subset of the plurality of first samples that have been incorrectly classified; and
identify a second subset of the plurality of second samples that have been incorrectly classified.

17. A system in accordance with claim 16, wherein said at least one processor is further programmed to combine the plurality of class generic features extracted from the first subset of the plurality of first samples and the plurality of class specific features extracted from the second subset of the plurality of second samples to generate the plurality of supplemental images.

18. A system in accordance with claim 10, wherein said at least one processor is further programmed to randomize the plurality of class generic features and the plurality of class specific features prior to combining the plurality of class generic features and the plurality of class specific features.

19. A computer readable medium for identifying at least one feature in at least one image of a component, said computer readable medium configured to cause a processor to perform the following steps: classify each sample image of a plurality of sample images in a first database as a first sample or a second sample; extract at least one class generic feature from each first sample to generate a plurality of class generic features; extract at least one class specific feature from each second sample to generate a plurality of class specific features; analyze the classification of the plurality of sample images; identify a first subset of the plurality of first samples that have been incorrectly classified; identify a second subset of the plurality of second samples that have been incorrectly classified; combine the plurality of class generic features extracted from the first subset of the plurality of first samples and the plurality of class specific features extracted from the second subset of the plurality of second samples to generate a plurality of supplemental images; store the plurality of sample images and the plurality of supplemental images in a second database; classify each sample image of the plurality of sample images and each supplemental image of the plurality of supplemental images in the second database; and identify the at least one feature in the at least one image of the component, wherein the computer readable medium is configured to learn from the classification of the plurality of sample images and the plurality of supplemental images to increase the accuracy of the computer readable medium in identifying the at least one feature of the component.

20. A computer readable medium in accordance with claim 19, wherein a ratio of the number of second samples to the number of sample images is less than a predetermined threshold, wherein the plurality of supplemental images are classified as supplemental second samples, and wherein a ratio of the sum of the second samples and the supplemental second samples to the number of sample images is greater than or equal to the predetermined threshold.

* * * * *